United States Patent [19]
Cooper

[11] Patent Number: 5,499,295
[45] Date of Patent: Mar. 12, 1996

[54] METHOD AND APPARATUS FOR FEATURE AUTHORIZATION AND SOFTWARE COPY PROTECTION IN RF COMMUNICATIONS DEVICES

[75] Inventor: Gerald M. Cooper, Gretna, Va.

[73] Assignee: Ericsson Inc., Lynchburg, Va.

[21] Appl. No.: 113,643

[22] Filed: Aug. 31, 1993

[51] Int. Cl.⁶ .................................. H04L 9/00; H04L 9/32
[52] U.S. Cl. ..................................... 380/23; 380/4; 380/9; 380/25; 380/49; 380/50
[58] Field of Search .............................. 375/1, 200–210; 380/4, 9, 20, 23, 30, 34, 49, 50; 455/349

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,246,638 | 1/1981 | Thomas | 395/375 |
| 4,424,414 | 1/1984 | Hellman et al. | 380/30 |
| 4,446,519 | 5/1984 | Thomas | 395/425 |
| 4,525,865 | 6/1985 | Mears | 455/186.2 |
| 4,593,155 | 6/1986 | Hawkins | 379/62 |
| 4,633,036 | 12/1986 | Hellman et al. | 380/30 |
| 4,658,093 | 4/1987 | Hellman | 380/25 |
| 4,811,377 | 3/1989 | Krolopp et al. | 379/62 |
| 4,862,156 | 8/1989 | Westberg et al. | 345/133 |
| 4,864,599 | 9/1989 | Saegusa et al. | 379/61 |
| 4,887,311 | 12/1989 | Garner et al. | 455/349 X |
| 4,897,875 | 1/1990 | Pollard et al. | 380/21 |
| 4,941,174 | 7/1990 | Ingham | 380/52 |
| 5,023,936 | 6/1991 | Szczutkowski et al. | 455/90 |
| 5,029,207 | 7/1991 | Gammie | 380/10 |
| 5,062,132 | 10/1991 | Yasuda et al. | 379/61 |
| 5,068,894 | 11/1991 | Hoppe | 380/23 |
| 5,077,790 | 12/1991 | D'Amico et al. | 380/23 |
| 5,091,942 | 2/1992 | Dent | 380/46 |
| 5,109,403 | 4/1992 | Sutphin | 379/59 |
| 5,120,939 | 6/1992 | Claus et al. | 235/382 |
| 5,132,729 | 7/1992 | Matsushita et al. | 355/203 |
| 5,148,485 | 9/1992 | Dent | 380/46 |
| 5,150,412 | 9/1992 | Maru | 380/43 |
| 5,153,919 | 10/1992 | Reeds, III et al. | 380/44 |
| 5,237,611 | 8/1993 | Rasmussen et al. | 380/21 |
| 5,249,227 | 9/1993 | Bergum et al. | 380/4 |
| 5,301,247 | 4/1994 | Rasmussen et al. | 380/43 |

Primary Examiner—Bernarr E. Gregory
Attorney, Agent, or Firm—Nixon & Vanderhye

[57] ABSTRACT

A hardware-software security arrangement enables manufacturers of digital RF communications equipment to provide differently configured products having substantially identical hardware and operational control software. Only authorized units are permitted to activate software-controlled "optional" features. The software is protected against unauthorized modifying, copying and uploading/downloading. The security arrangement allows a manufacturer to control the distribution of functional features and operational software upgrades by requiring a product-specific authorization. Each individual unit has a read-only storage device containing a unique device-specific value. "Checksum" data is uniquely computed by the manufacturer for each individual product unit according to a "feature authorization code" specifying particular authorized functional features and the device specific value by using a particular data transformation. This computed data is stored in the unit. On power-up, the unique checksum data is recalculated by the device and compared to the stored checksum data. The unit enables only the most basic functions if the comparison is unfavorable. If the comparison is favorable, then particular features specified by the "feature authorization code" are enabled. The unit may also be updated in the field to provide additional features by providing the manufacturer with the device serial number, obtaining a newly calculated "checksum" based on the desired additional features, and dynamically downloading this information into the device.

42 Claims, 2 Drawing Sheets

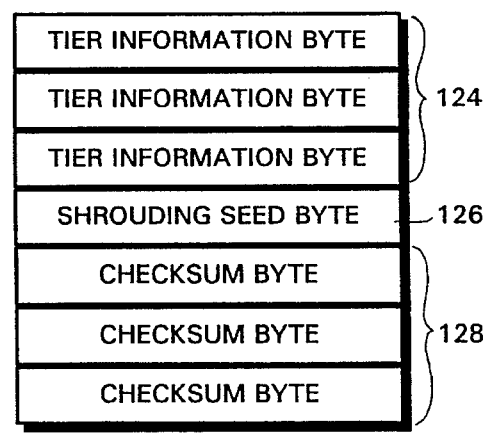
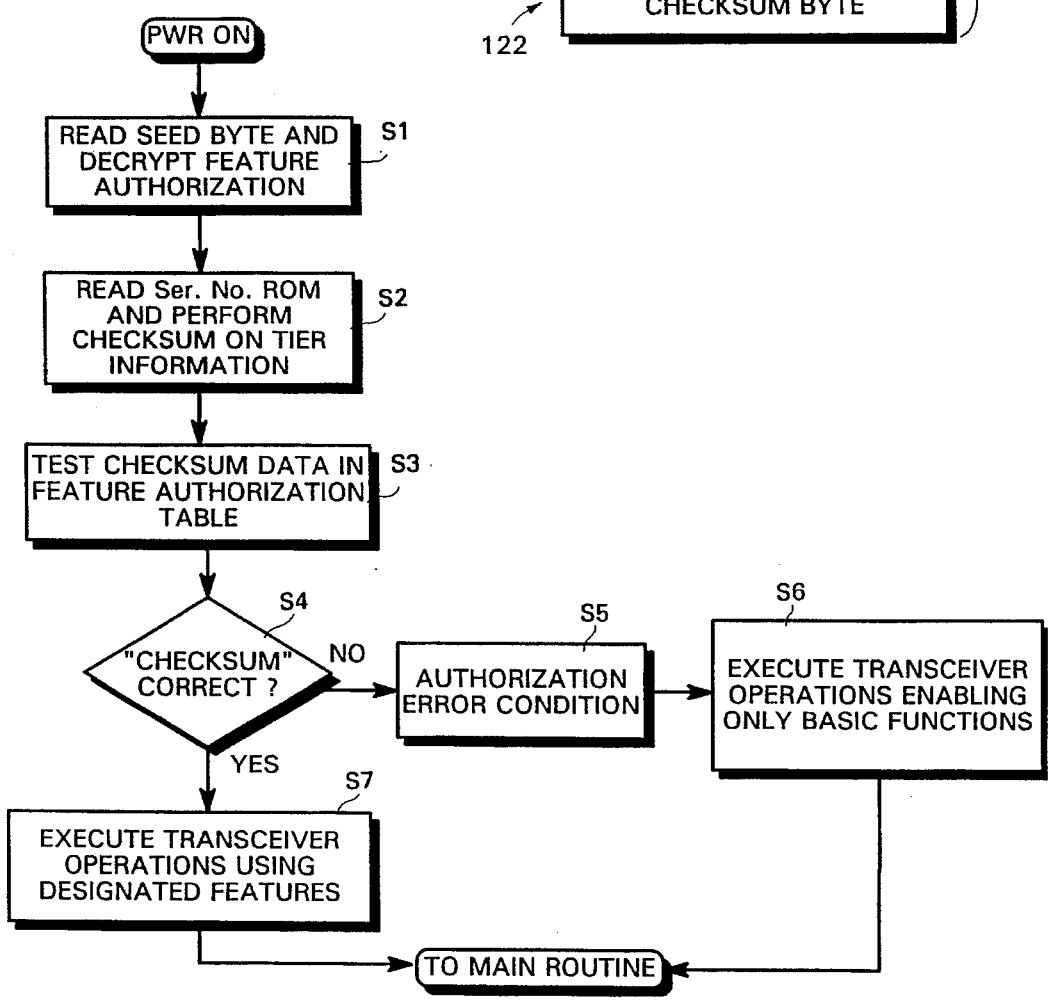

METHOD AND APPARATUS FOR FEATURE AUTHORIZATION AND SOFTWARE COPY PROTECTION IN RF COMMUNICATIONS DEVICES

FIELD OF THE INVENTION

This invention relates generally to radio frequency (RF) communications devices, and more particularly to secure feature authorization and software copy protection arrangements for mobile and portable radio transceivers.

BACKGROUND AND SUMMARY OF THE INVENTION

To satisfy the differing requirements of different customers, it is often desirable for manufacturers of radio communications devices to offer several different configurations for each "model" of communications product manufactured. A particular model of mobile radio transceiver may have a "basic" or minimal configuration but may optionally be provided with additional or enhanced features at additional cost.

For example, a basic transceiver configuration may provide communications over a limited number of communications channels for basic radio transmitting and receiving functions required by all users. Some users may, however, have additional requirements requiring additional features and capabilities—such as additional communications channels, receiver channel scanning, telephone access (DTMF) capability, etc. The ability of a manufacturer to provide such additional or enhanced features increases the flexibility, versatility, desirability and range of product applications. Since the additional/enhanced features involve additional development cost and provide added value, it is fair to charge customers more for the configurations with enhanced or increased capabilities. Purchasers of the basic model pay a lower price for a more minimal configuration, while users wanting additional features pay an increased price. Several different "enhanced" configurations may be offered to give customers more choices regarding cost and associated value.

In the past, additional features were generally provided by incorporating additional (or different) components and circuitry. For example, channel scanning capability or additional operating channels were sometimes added by installing additional frequency selection circuitry. Transceiver designers conventionally used modular architectures to accommodate additional plug-in modules.

While older radio transceivers required additional circuitry to perform additional, optional functions such as channel scanning, tone activated squelch and the like, modern digital microprocessor controlled transceivers are capable of performing such additional functions under software control with little or no additional circuitry. For example, receiver channel scanning can be implemented by providing an enhanced receiver program control routine controlling the microprocessor to periodically monitor activity on various channels—and additional frequency data can be stored in a "personality PROM" memory device to provide additional transceiver operating channels. Additional tone generating, decoding and control algorithms performed by the microprocessor under control of additional program control software can provide advanced squelch control functions, DTMF and other tone signalling functions, and the like. Other enhancements and capabilities can similarly be implemented with additional software only—so long as the basic configuration includes sufficient necessary supporting functionality.

It would be unfair (and also poor marketing strategy) to require users needing only a minimal transceiver configuration to pay for the high development cost of advanced features and enhancements. Accordingly, for various reasons it is still very much advantageous to offer the purchaser a "basic" lower cost transceiver configuration while permitting him or her to select additional features at higher cost—even though the main (and sometimes the only) difference between the basic and the enhanced transceivers may be the specific program control routines they execute. This strategy allows the manufacturer to offer an "entry level" basic unit at reduced cost, and requires purchasers desiring enhanced operation to bear the additional costs associated with developing and providing the additional features. A still further benefit achieved by this strategy is that overall development, manufacturing and inventory costs are reduced substantially—since the same basic hardware configuration can be used for all models of the product. This cost efficiency can result in lower overall costs to all customers.

For this strategy to be successful, however, purchasers of low cost basic transceiver configurations must not be able to easily modify their units to obtain more expensive features. Otherwise, most purchasers would simply buy the "bottom-of-the-line" model and then modify it to obtain additional features (thereby unfairly obtaining the benefit of features they did not pay for). Thus, an extremely difficult problem arises as to how to prevent unauthorized field upgrading of "lower tier" products (having fewer features) to higher tier products (having more features).

One possible way to prevent purchasers from modifying transceiver units to obtain features they have not paid for is to provide different transceiver configurations, these configurations all having essentially the same hardware but including different program store PROMs (programmable read only memories). This technique provides, in each transceiver configuration, a PROM storing only the subset of the program control instructions and transceiver parameter data associated with the specific configuration. This approach has several disadvantages, however. A major disadvantage is the increased cost of developing, maintaining and supporting the various different versions of the software. Another important disadvantage is that authorized in-the-field transceiver "upgrading" becomes very difficult and time consuming. Ultra-miniaturization provided by modern manufacturing and packaging techniques now make it possible to inexpensively "pack" hundreds or thousands of components into a very small physical volume (e.g., the interior volume of a hand-held digital radio transceiver). Such assemblies are often extremely difficult, however, to disassemble after they have been assembled at the factory—requiring the appropriate program store memory to be installed at time of manufacture. In addition, a large inventory of various different versions of the program store memory must be maintained, and the final configuration of a particular transceiver must be determined at the time of manufacture.

It would be highly desirable to somehow defer the time particular units are configured (and also allow reconfiguration at a later time). If configuration could occur at or near time of purchase, for example, distributors would only need to keep one model in inventory. This would allow enhanced marketing flexibility in that different tiers of feature combinations could be offered, while maintaining identical hardware and software across the different tiers. It would also be desirable to provide an arrangement such that an "authorized" upgrading of features could be accomplished quickly and easily in the field without necessitating disassembly of the product. Moreover, it would be desirable to provide the manufacturer with the ability to sell operational software and functional feature upgrades on a per radio product (transceiver) basis without requiring the establishment and maintenance of a customer-product data base.

It is also known in certain prior art devices to enable or disable functions by substantially irreversibly modifying circuitry. For example, electronic equipment circuit boards can be designed such that the cutting of specific conductive traces will activate or deactivate various features. Besides the obvious disadvantages of being difficult, inconvenient and time consuming for the vendor or distributor to implement (e.g., a soldering iron or razor blade is needed to change the configuration), the arrangement provides no protection against unauthorized modifications by an unscrupulous customer Likewise, it is also generally known to set configurations by selecting continuity/discontinuity between processor-readable connections. For example, it is common for manufacturers of boards for personal computers to include so-called DIP (dual in-line package) switches or jumpers on their boards to allow the user to set parameters (e.g., bus address, interrupt, or the like) associated with the hardware. Such switches/jumpers may in some cases be used to provide information (e.g., "my address is" or "my hardware configuration is") to the processor communicating with the hardware (thus allowing the system to automatically "configure" itself under software control upon power up, for example). Of course, jumpers and DIP switches are designed such that it is easy to change the configurations they select. As a cost-saving measure, some manufacturers may in the past have eliminated the jumpers and/or DIP switches altogether and, instead, provided PC board pathways the user or installer must cut or scrape off to provide bus address information or the like. These arrangements are often troublesome to implement, as discussed above, and are therefore typically reserved for the cheapest of devices. Moreover, it is unclear how jumpers or DIP switches could be used to specify radio configuration on the hardware level at time of radio purchase while preventing users from later changing the specified configuration.

The following is a by no means exhaustive list of possibly "relevant" prior patents and publications:

U.S. Pat. No. 4,525,865—Mears
U.S. Pat. No. 4,658,093—Hellman
U.S. Pat. No. 4,862,156—Westberg et al
U.S. Pat. No. 5,023,936—Szczutkowski et al
U.S. Pat. No. 4,941,174—Ingham
U.S. Pat. No. 5,062,132—Yasuda
U.S. Pat. No. 5,153,919—Reeds, III et al
U.S. Pat. No. 5,068,894—Hoppe
U.S. Pat. No. 5,109,403—Sutphin
U.S. Pat. No. 4,799,635—Nakagawa
U.S. Pat. No. 3,959,610—Finnegan et al
U.S. Pat. No. 4,378,551—Drapac
U.S. Pat. No. 4,392,135—Ohyagi
U.S. Pat. No. 4,247,951—Hattori et al
U.S. Pat. No. 4,254,504—Lewis et al
U.S. Pat. No. 4,510,623—Bonneau et al
U.S. Pat. No. 4,688,261—Killoway et al
U.S. Pat. No. 4,618,997—Imazeki et al
U.S. Pat. No. 4,771,399—Snowden et al
U.S. Pat. No. 4,484,355—Henke et al
U.S. Pat. No. 4,555,805—Talbot
U.S. Pat. No. 4,670,857—Rackman
U.S. Pat. No. 4,446,519—Thomas
U.S. Pat. No. 4,246,638—Thomas
U.S. Pat. No. 4,638,120—Herve
U.S. Pat. No. 4,621,373—Hodson
U.S. Pat. No. 4,593,155—Hawkins
U.S. Pat. No. 4,864,599—Saegusa et al.
U.S. Pat. No. 5,029,207—Gammie
U.S. Pat. No. 4,811,377—Krolopp et al.
U.S. Pat. No. 5,077,790—D'Amico et al.
U.S. Pat. No. 5,091,942—Dent
U.S. Pat. No. 5,120,939—Claus et al.
U.S. Pat. No. 5,132,729—Matsushita et al.
U.S. Pat. No. 5,148,485—Dent
U.S. Pat. No. 5,150,412—Maru
U.S. Pat. No. 4,633,036—Hellman
U.S. Pat. No. 4,633,036—Hellman et al.
U.S. Pat. No. 4,424,414—Hellman et al.
U.S. Pat. No. 4,218,582—Hellman et al.
U.S. Pat. No. 4,200,770—Hellman et al.
U.S. Pat. No. 4,897,875—Pollard et al.
"DYNA T-A-C 6000X Universal Mobile Telephone", Motorola (1984)
Groh, "The µP: The Key to an Advanced Frequency Synthesized HF SSB Amateur Radio Transceiver", *IEEE Transactions on Consumer Electronics* Vol. CE-26 (1980).

U.S. Pat. No. 4,525,865 to Mears discloses an arrangement whereby a non-volatile memory within a mobile radio transceiver can be reprogrammed without physical entry into the transceiver or removal of components to provide the radio with additional operational options (e.g., tone or digital addresses, carrier control timers, or the like). However, if such reprogramming were used to provide optional advanced features, there may be nothing (other than the copyright laws) preventing an intelligent purchaser from downloading upgrade information into the internal non-volatile memory of another transceiver of identical or compatible hardware (thus effectively obtaining non-purchased benefits of the upgrade for another transceiver). Accordingly, the Mears solution is highly effective to permit customization of transceiver "personality" information (i.e., transceiver operating parameters), but may have a somewhat more limited utility in selecting the basic set of operational features to be provided in particular transceivers.

U.S. Pat. No. 4,941,174 to Ingham, mentioned in the preceding list above, provides a highly suitable and successful solution to the problem of configuring a digital radio transceiver subsequent to time of manufacture. In that arrangement, a single "base" transceiver unit is manufactured, this transceiver base unit being common to all of several different transceiver configurations. Different transceiver front panel "escutcheon plates" carrying different control configurations (e.g., buttons and other controls) are provided for the different transceiver configurations. The escutcheon plate modules corresponding to all but the "basic" configuration also carry a "security circuit" which communicates with the transceiver microprocessor within the base unit at certain times (e.g., during transceiver "power up "). Different security circuits are provided for the different escutcheon plate configurations, each of the different security circuits permutating signals sent to them in a different way. The purchaser cannot obtain additional functionality by merely providing additional controls—he must also provide the security circuit corresponding to the new control configuration. Great security is provided against tampering with or defeating of the security circuit because the permutation function performed by the circuit is complex and emulation would require sophisticated techniques and/or a physically large circuit.

While the Ingham arrangement is highly successful in its own right, further improvements are possible. In particular, the escutcheon plates used in the Ingham arrangement are somewhat expensive to manufacture, since they may carry entire electromechanical switch assemblies, electrical connectors, and (for units having "optional" features) an electronic security circuit.

Another approach is found in U.S. Pat. No. 5,023,936 to Szczutkowski et al. In this approach, the same basic transceiver unit is used for several different transceiver feature configurations. This "basic" transceiver unit includes all of the software controlled features and functions of the "top of the line" transceiver feature configuration and thus provides a superset of the features and functions provided by the other transceiver "models." In addition, this basic transceiver unit is also provided with a mechanism for irreversibly selecting a subset of the total software controlled features provided in the basic transceiver unit—this selection mechanism being operable from outside of the transceiver case. Once made, the selection is difficult or impossible to reverse—preventing a purchaser from defeating the selection in an attempt to enable additional transceiver functions. While this technique is also highly advantageous, reconfiguration of an already configured unit is not possible due to the irreversibility of the selection.

The method and apparatus for feature authorization encryption and software copy protection in accordance the present invention overcomes these problems while providing additional benefits.

Briefly, the present invention provides digital radio communications device security arrangements that permit an authorized user to access standard communications functions (as well as additional functions the user requests at time of purchase of the radio or subsequently requested as an upgrade at a later time) while preventing unauthorized users from accessing the additional functions. The invention also provides software copy protection arrangements in program controlled digital radio transceivers of the type that perform various functions under control of internally stored program control instructions, and arrangements for allowing RF communications products that have identical hardware to be efficiently field upgraded with different combinations of "optional" features, while preventing unauthorized copying and/or downloading of upgraded program control information.

In accordance with one aspect of the present invention, each individual radio transceiver is provided with a read-only storage device having (e.g., storing) an associated unique identifying bit pattern (e.g., a "serial number" ROM). A value is uniquely computed for each individual transceiver unit based on a "feature enabling code" bit pattern specifying the particular functional features purchased by the customer; and the unit-identifying bit pattern. This value (which corresponds uniquely to a particular transceiver unit and indicates a particular feature list or level authorized for that unit) is computed based on a predetermined "secret" (albeit conventional) data transformation known only to the manufacturer. The feature enabling code specifying the features to be enabled and the unique computed value are then preferably encrypted using a randomly chosen "shrouding seed." The unique computed value is loaded (along with the "shrouding seed") into a Feature Authorization Table stored in a non-volatile memory (e.g., "Personality PROM") within the radio transceiver.

On transceiver power-up, a feature authorization routine decrypts the contents of the Feature Authorization Table to obtain a "clear" version of the feature enabling code; and also generates its own version of the unique computed value from the identifying bit pattern (e.g., serial number) stored in ROM, and from the decrypted feature enabling code from the Feature Authorization Table. The feature authorization routine uses the same "secret" data transformation operation used to calculate the computed value originally. The value computed by the transceiver is then compared to the previously computed value stored in the Feature Authorization Table. If the values are identical, transceiver operations are permitted to use the designated features. However, if the transceiver computed value does not match the stored value, the transceiver operates with only the most basic functions and disables all advanced and enhanced features.

The provision of a serial number ROM which effectively "embeds" a unique identifying bit pattern into the hardware of each transceiver unit allows the data transformation operation to uniquely identify individual radio transceivers while effectively preventing tampering with this identification. Providing the unique identifying bit pattern in hardware ("firmware") is desirable to protect against the copying (downloading) of the software or the "personality" code of one radio into another radio thereby defeating the protection. Since the computed value is a function of both the feature enabling code and the unique device specific identifying bit pattern, changing even a single bit of the feature enabling code will cause the comparison to fail. Accordingly, any change in the feature enabling code requires a new computed value, which is only available from the manufacturer. This arrangement effectively prevents unauthorized modifications to the feature enabling code (for example, to obtain additional non-purchased features) and allows the manufacturer to provide various combinations of features on a "per product" basis. Moreover, encrypting the computed data and the feature enabling code provides additional protection against unscrupulous "hacking" or reverse engineering of the proprietary datatransformation algorithm used to compute the value for comparison.

BRIEF DESCRIPTION OF THE DRAWINGS

These and other features and advantages of the present invention will be better and more completely understood by referring to the following detailed description of presently preferred exemplary embodiments in conjunction with the appended sheets of drawings, of which:

FIG. 2 is a schematic block diagram of an exemplary data structure for a Feature Authorization Table in accordance with the preferred embodiment of the present invention shown in FIG. 1; and FIG. 3 is a flowchart of exemplary program control steps performed by the presently preferred RF communication transceiver microprocessor shown in FIG. 1.

Figure 1:
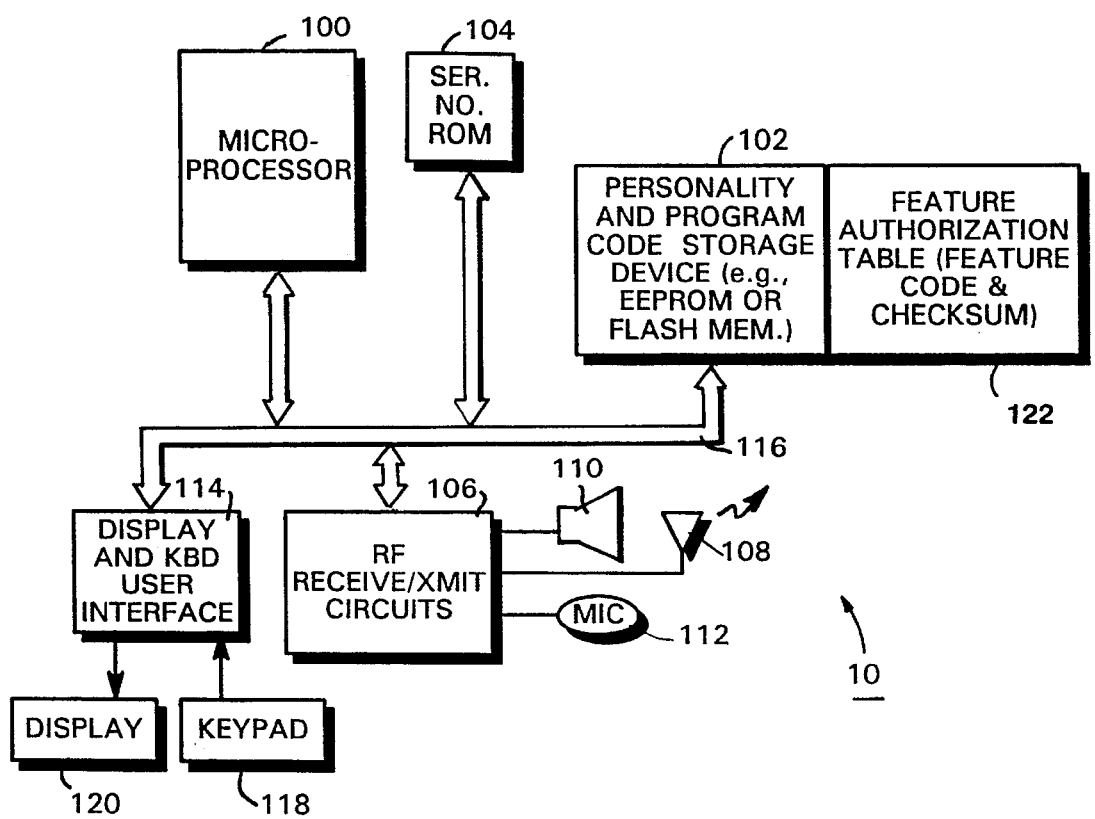
FIG. 1 is a schematic block diagram of an exemplary microprocessor-based RF communications transceiver in accordance with a presently preferred exemplary embodiment of the present invention.

DETAILED DESCRIPTION OF THE
PRESENTLY PREFERRED EXEMPLARY
EMBODIMENT

FIG. 1 is a schematic block diagram of a presently preferred microprocessor-based RF (radio frequency) transceiver system (10) in accordance with the present invention.

Transceiver system 10 includes microprocessor 100, operational program control code and "personality" code non-volatile storage device 102 (e.g., an EEPROM or FLASH memory), "serial-number" read only memory (ROM) device 104, RF receiver and transmitter circuitry 106 coupled to RF antenna 108, loudspeaker 110, microphone 112, and keypad/display user interface circuits 114.

Microprocessor 100 controls and monitors the operation of RF transmit and receive circuitry 106 in a conventional manner via an exchange of digital signals communicated over a transceiver system local bus 116 or other internal signal connection pathways. Personality and program code storage device 102 (which in the preferred embodiment is an EEPROM although it may be any suitable non-volatile memory device) is a program store containing digital instructions for execution by microprocessor 100. These stored instructions bring about the result of causing microprocessor 100 to communicate with and control various transceiver circuit operations. RF circuitry 106 (which in the preferred embodiment includes a conventional digital control frequency synthesizer, audio and RF amplifiers, a receiver detector, an RF modulator, and other conventional RF transceiving components) receives and demodulates RF signals to provide a received audio output signal to loudspeaker 108; and generates, modulates (with audio signals obtained from microphone 112, for example) and transmits RF signals—all at RF frequencies specified by microprocessor 1, under program control (e.g., at operating frequencies determined by transceiver "personality" parameter data stored in ROM 102). Microprocessor 100 also monitors a transceiver control input keypad 118, and provides status and operational information to a transceiver display panel 120 via user interface circuits 114.

The digital instructions stored in non-volatile program store 102 include the transceiver operational control program. It is this program code that implements all basic transceiver functions necessary for communication, as well as a variety of additional "optional" functions that alter or enhance the capabilities of a particular transceiver. Also stored in transceiver system 10 (e.g., in storage device 102) and accessible by the control program is a block of "secure" data utilized as a "Feature Authorization Table" 122. In accordance with a preferred embodiment of the present invention, Feature Authorization Table 122 is encrypted, and contains binary values (feature enabling code) that are used to selectively enable or disable portions of the programming in the operational control program that controls transceiver operations.

At the option of the manufacturer, particular predetermined combinations of features may be arranged into "tiers" of authorization in order to accommodate various marketing considerations. The manufacturer can easily define any number of distinct tiers by simply choosing which features are to be enabled for each tier. For example, the block of data in the Feature Authorization Table 122 that contains tier information bytes 124 can conceptually be broken down into numerous bit and byte sections which are then assigned to provide customized feature authorization categories for particular user systems or groups (e.g., see Table 1 discussed below). Alternatively, it is also possible to configure the Feature Authorization Table to operate in a completely "tierless" fashion by assigning individual user feature enable flags and then having the transceiver controlling software possible to examine each feature in the Feature Authorization Table on a feature-by-feature basis to determine if that particular feature is enabled.

In addition to the Feature Authorization Table and the program code for controlling and enabling various operations, transceiver system 10 also stores (preferably in a separate PROM or in storage device 2) "personality" parameter data necessary for implementing various selected functions. For example, a "basic" transceiver configuration may operate alternatively on either of two predetermined different radio frequency channels with no "optional" or feature functions (such as, multi-channel capabilities, auto scan, T99 decode, etc). However, frequency allocation values for as many as 128 different radio frequency pairs (channels) may be stored in memory device 102, or in another PROM separate from the operational program control code storage, as part of the particular transceiver model "personality" parameter data. Thus, in accordance with a particular tier of feature authorization, the program control code may be permitted to select between more than one frequency pair data from the personality parameter data store, thereby enabling the transceiver to communicate over two or more channels.

In the preferred embodiment, personality and program storage device 102 is a non-volatile EEPROM device that can be preprogrammed by the manufacturer or programmed in-the-field by the equipment dealer or by the customer. Programming storage device 102 requires only the use of a conventional personal computer, an interfacing cable and conventional EEPROM programmer hardware. Moreover, when a performance upgrade is performed in the field (e.g., by an equipment dealer or by the customer), the entire operational control program need not be replaced. Instead, to activate particular feature upgrades it is only necessary to replace a small block of feature enabling code stored in Feature Authorization Table 122.

FIG. 2 schematically shows an exemplary organization of the data structure for Feature Authorization Table 122. Exemplary Feature Authorization Table data structure 122, consisting of one or more tier information bytes 124, a single byte random encryption or "shrouding" seed 126, and several "checksum" bytes 128. (The term "checksum" as used in this context is the result of a particular data transformation function or operation, as explained in greater detail below). Tier information bytes 124 contain digital information bit patterns organized into preassigned bit and byte fields that correspond to various "options" or functional features. Each preassigned bit field or byte field contains a digital authorization code (feature enabling code) that is checked by the control program to enable a corresponding transceiver function. Consequently, different "tiers" of feature combinations can be provided by using different combinations of feature enabling code bits. The specific number of tier information bytes and checksum bytes in the Feature Authorization Table is predetermined according to the specific needs of a particular transceiver model/product line.

Checksum bytes 128 and shrouding seed byte 126 are utilized by a feature authorization routine (discussed with respect to FIG. 3 below), which is part of the transceiver operational control program, to authorize the feature enabling code stored in tier information bytes 124. Before being stored in Feature Authorization Table 122, checksum bytes 128 and tier information bytes 124 are "shrouded" by a conventional (albeit proprietary secret) encryption scheme. For example, a simplistic conventional-cyclic redundancy code (CRC) scheme or other conventional digital data encryption/decryption technique may be used to "shroud" the data stored in Feature Authorization Table 122. Shrouding and encryption schemes of the type contemplated are well known and exemplary teachings may be found in such texts as *Error Control Coding—Fundamentals and Applications* by Shu Lin and Daniel J. Costello, Jr. (Prentice Hall 19), or *Cryptography: A New Dimension In Computer Data Security*, by C. H. Meyer and S. M. Matyas (John Wiley & Sons 1982).

In the preferred embodiment, the entire Feature Authorization Table 122) is encrypted except for the "shrouding" seed byte 126. Whenever the transceiver is in use (e.g., upon initial power up), the feature authorization routine decrypts the information in table 122 based on the digital information stored in the shrouding seed byte 126 in accordance with the predetermined shrouding algorithm.

Prior to this "shrouding" of Feature Authorization Table 122 information, the checksum information stored in checksum bytes 26 is itself the result of a predetermined proprietary permutation function or other data transformation operation (developed by the transceiver manufacturer and preferably of a conventional type such as discussed in the publications mentioned above). However, in accordance with an aspect of the present invention, the data transformation operation operates on both the tier information bytes 124 and on the transceiver unique serial number contained in a Serial Number ROM (SNROM) device (104 in FIG. 1). (A Serial Number ROM device (e.g., such as manufactured by Dallas Semiconductor) is a read only memory device which stores a single unique digital value. SNROM devices are conventionally manufactured in customized batches with each SNROM storing a single incrementally different digital number of a specified numerical series. Thus, Feature Authorization Table "checksum" data is created for each individual transceiver device according to the particular functional features authorized (reflected in the tier information bytes 124) and the unique unit-specific serial number by using a particular proprietary data transformation algorithm known only to the manufacturer.

The unique "checksum" data and the tier information are preferably encrypted using a shrouding seed (which may be randomly chosen) and then loaded along with the shrouding seed, into program store 102 within Feature Authorization Table 122. Consequently, feature authorization data in accordance with particular desired features preselected by the customer may be easily computed and loaded into a "basic" model radio transceiver by the manufacturer (or distributor) at time of sale. Alternatively, the entire Feature Authorization Table data structure 122 may be calculated at any subsequent time by the transceiver manufacturer (or vendor) based on a customer supplied serial number and then forwarded to the customer for downloading into a particular transceiver. This provides a convenient means for upgrading products in the field without the need for disassembly or replacement of costly modular components. When calculating a replacement Feature Authorization Table 122 for a radio already in service, it is desirable to ensure that the new shrouding seed chosen is different from the original shrouding seed.

Each time transceiver 10 is turned on, after decrypting the information in Feature Authorization Table 122, the feature authorization routine stored in program store 102 will perform the "checksum" calculation (using the same proprietary algorithm) on tier information bytes 124 using the unique serial number from ROM 104. The routine compares the result with checksum bytes 128. If the calculated checksum matches the stored checksum bytes 128, the feature enabling code encoded by the tier information bytes 124 is used to authorize corresponding features. However, if an incorrect checksum is encountered (i.e., the comparison does not result in a match), the feature authorization routine only enables the most basic ("lowest tier") transceiver functions necessary for operation. This arrangement effectively prevents unauthorized field upgrading of features. Since the checksum is a function of the tier information bytes and the unique device specific serial number, changing even a single bit of tier information block 124 will cause the checksum comparison test to fail. Thus, new tier information (i.e., any change in the feature enabling code) requires a new "checksum", which is only available from the manufacturer.

Table 1 below, illustrates an exemplary assignment of feature authorization bits and bytes within tier information byte blocks of FIG. 2. This exemplary arrangement for the data structure of the tier information bytes may serve as a basis for implementing a multi-tiered hierarchy of programmable feature combinations.

TABLE 1

FEATURE ARRAY SIZE BYTE

| Byte # | BYTE BLOCK |
| --- | --- |
| n | Feature Authorization Byte 0 |
| n + 1 | Feature Authorization Byte 1 |
| n + 2 | Feature Authorization Byte 2 |
| n + 3 | Feature Authorization Byte 3 |

BIT BLOCK SIZE BYTE

| Byte # | BIT BLOCK | | | | | | | |
| --- | --- | --- | --- | --- | --- | --- | --- | --- |
| n | bit 00 | bit 01 | bit 02 | bit 03 | bit 04 | bit 05 | bit 06 | bit 07 |
| n + 1 | bit 08 | bit 09 | bit 10 | bit 11 | bit 12 | bit 13 | bit 14 | bit 15 |
| n + 2 | bit 16 | bit 17 | bit 18 | bit 19 | bit 20 | bit 21 | bit 23 | bit 23 |

The "Feature Array Size Byte" specifies the size (in bytes) of the section of tier information bytes 124 containing the "Bit Block size", the "Bit Block", and the "Byte Block", as illustrated in the table above. The "Bit Block Size" byte specifies the number of bytes making up the Bit Block. The "Bit Block" is an array of bits used to enable/disable options that are Boolean in nature; i.e., a bit is either present ("1") or not present ("0"). In TABLE 1, a three byte Bit Block is shown to illustrate the general format, however, the actual size of the Bit Block may differ and is determined by the minimum number of bytes necessary to accommodate the Feature Authorization Bits currently defined. Leftover (undefined) bits are set to zero ("0").

The "Byte Block" contains an array of bytes used to define features that can not be defined with a single bit. In TABLE 1, a four byte "Byte Block" is shown to generally illustrate the exemplary format, however, the actual size of the Byte Block is determined by the minimum number of bytes necessary to accommodate the Feature Authorization Bytes currently defined.

The following list provides some exemplary Feature Authorization Bit assignments which may be implemented by utilizing the data structure illustrated in TABLE 1:
Bit 0: Group Scan:
  This bit is used to authorize a Group scan operation.
  ("0"=not authorized).
Bit 1: Public Address:
  This bit is used to authorize a Public Address function.
  ("0"=not authorized).
Bit 2: Priority System Scan:
  This bit is used to authorize a Priority System Scan operation.
  ("0"=not authorized).

Bit 3: Conventional Priority Scan:
  This bit is used to authorize a conventional mode Priority Scan operation.
  ("0"=not authorized).
Bit 4: Wide Area System Scan:
  This bit is used to authorize a Wide Area System Scan.
  ("0"=not authorized).
Bit 5: Three Site Scan:
  This bit is used to authorize a three site scan operation.
  ("0"=not authorized).
Bit 6: Emergency Operation:
  This bit is used to authorize an Emergency Operation.
  ("0"=not authorized).
Bit 7: Dynamic Regroup:
  This bit is used to authorize a Dynamic Regroup operation.
  ("0"=not authorized).
Bit 8: Conventional Emergency operations:
  This bit is used to authorize conventional emergency mode operation.
  ("0"=not authorized).
Bit 9: Type 99 Encode:
  This bit is used to authorize Type "99" encoding.
  ("0"=not authorized).

The following provides some exemplary "Feature Authorization Byte" assignments which may be implemented by utilizing the data structure illustrated in TABLE 1:

Bytes 0, 1: Conventional Channel Capacity:
  This two byte field is used to determine the maximum number of conventional channels the radio will be permitted to access.
Bytes 2, 3: System/Group Capacity:
  This two byte field is used to determine the maximum number of system/group combinations the radio can operate on.
Byte 4: Authorized Control Unit:
  This byte is used to determine the control units with which the radio will be permitted operate (For example, if this byte is 255 (FF hex) then the radio will be permitted to operate with any control head; if the radio should be restricted to a particular control head then a serial identifier hex code for that particular control head is inserted here).

FIG. 3 is a flowchart of an exemplary preferred feature authorization routine. Initially upon power up of a transceiver and before execution by microprocessor 100 of any other control program routines, the feature authorization routine of FIG. 3 is executed. At step S1, the non-encrypted "shrouding" seed byte 126 is read from a predetermined position in Feature Authorization Table 122 and used to decrypt tier information 124 and checksum information 128. Next, at step S2, information from the Serial Number ROM 104 is read and used in conjunction with decrypted feature enabling code ("tier information") information from the tier information bytes (124) to compute a "checksum" based a on predetermined data transformation function. This calculated checksum is compared at step S3 with the decrypted checksum value 128 from Feature Authorization Table 122. Next, in branching step S4, if the checksum is correct, transceiver control program operations are permitted to proceed as normal (at step S7) using features as authorized by the information in tier information bytes 22. However, if the calculated checksum is not correct ("no" exit of decision box S4), an authorization error condition has occurred (as shown in flowchart box S5) and subsequent transceiver operations will be permitted (step S6), but with only the basic necessary operational features enabled.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A program-controlled digital radio transceiver including:
  digitally controlled radio frequency transceiving circuitry;
  a digital controller for controlling a plurality of transceiving functions in response to control information stored in a memory associated therewith;
  said memory storing said control information and also storing transceiver function-enabling information;
  an identification storage device for storing an identifying value uniquely associated with said transceiver; and
  feature authorization means for performing at least one predetermined mathematical transformation operation involving both said function-enabling information and said identifying value to compute results, said feature authorization means authorizing said digital controller to perform selected transceiving functions in response to said computed results.

2. The digital transceiver of claim 1 wherein said memory for storing transceiver function-enabling information is a non-volatile memory.

3. The digital transceiver of claim 1 wherein said identification storage device is a non-programmable read only memory.

4. The digital transceiver of claim 1 wherein said memory stores precomputed results, and said feature authorization means includes a means for comparing the computed results of said transformation operation with said precomputed results value stored in said memory.

5. A digital radio transceiver of the type including a microprocessor for controlling a plurality of radio transceiving functions in response to program control information stored in a memory associated therewith, comprising:
  digitally controlled transceiving circuitry for transmitting and receiving radio frequency signals;
  a memory for storing function-enabling program control information, said function-enabling information being stored in an encrypted form;
  a serial number storage device for storing a serially assigned numerical value unique to said transceiver; and
  feature authorization means for decrypting said function-enabling information and for performing at least one predetermined mathematical transformation operation involving both decrypted function-enabling information and said unique assigned value, said feature authorization means authorizing said microprocessor to perform selected transceiving functions only if said transformation operation resulted in a predetermined value.

6. The digital transceiver of claim 5 wherein said memory for storing transceiver function-enabling information is a programmable non-volatile memory.

7. The digital transceiver of claim 5 wherein said serial number storage device is a non-programmable read only memory.

8. The digital transceiver of claim 5 wherein said feature authorization means includes a means for comparing the results of said transformation operation with a predetermined value stored in said memory.

9. In a digital radio communications device performing a plurality of radio transceiving functions in response to program control information stored in a memory associated therewith, said program control information including function-enabling information for selectively enabling various predetermined combinations of transceiving functions, a method for preventing use of unauthorized program control information comprising the following steps:

providing said digital radio communications device, at time of manufacture, with a serially assigned numerical value unique to said digital radio communications device, said serial number stored within said digital radio; and said digital radio communications device performing the further steps of:

(a) performing a mathematical data-transformation operation on said function-enabling information and said stored unique assigned value and (b) performing various transceiving functions authorized by said function-enabling information only if said data-transformation operation results in a predetermined value.

10. The digital radio communications device of claim 9, further comprising the step of comparing the results of said transformation operation to a predetermined value in said associated memory prior to said performing step (b), said predetermined value calculated, using the same data transformation operation, unique assigned value and function-enabling information as in step (a), and stored in said associated memory prior to power-up.

11. In a digital radio communications device for transmitting and receiving radio frequency signals of the type including a microprocessor for performing a plurality of radio transceiving functions in response to program control information stored in a memory associated therewith, said program control information including encrypted function-enabling information for selectively permitting the operation of various predetermined combinations of transceiving functions, a method for preventing unauthorized alteration, copying and/or downloading of said program control information into other products while allowing an authorized alteration of said function-enabling information to provide a different combination of functions, comprising the following steps:

providing said digital radio communications device, with:

a serially assigned numerical value unique to said digital radio communications device, a predetermined check value, and an encryption seed, said serial number, check value and encryption seed data stored electronically in said digital radio; and said digital radio communications device performing the further steps of:

(a) decrypting said function-enabling information stored in said associated memory based on said encryption seed data;

(b) performing a mathematical data-transformation operation on the decrypted function-enabling information of step (a) using said unique serial number; and (c) performing various transceiving functions authorized by said decrypted function-enabling information only if said data transformation operation results in said predetermined check value, said predetermined check value calculated using the same data-transformation operation, unique assigned value and function-enabling information as in steps (a) and (b), and stored in said associated memory prior to power-up.

12. In a digital radio communications device for transmitting and receiving radio frequency signals of the type including a microprocessor for performing at least first and second radio transceiving functions in response to program control information stored in a memory associated therewith, said program control information including function-enabling information for selectively permitting the operation of various predetermined combinations of transceiving functions, an arrangement for preventing unauthorized alteration, copying or downloading of said program control information into other products, while permitting an authorized alteration of said enabling information to provide a different combination of functions, comprising:

digitally controlled transceiver circuitry for transmitting and receiving radio frequency signals;

a memory for storing transceiver function-enabling information;

a serial number storage device for storing a serially assigned numerical value unique to said transceiver; and feature authorization means for performing at least one predetermined data transformation operation using said function-enabling information and based on said unique assigned value, said feature authorization means allowing selected transceiving functions to operate if said transformation operation resulted in a predetermined value.

13. The digital radio communications device of claim 12, wherein said feature authorization means includes a means for comparing the results of said transformation operation with a predetermined value stored in said associated memory.

14. In a digital radio communications device for transmitting and receiving radio frequency signals of the type including a microprocessor for performing a plurality of radio transceiving functions in response to program control information stored in a memory associated therewith, said program control information including function-enabling data for selectively permitting the operation of various predetermined combinations of transceiving functions, a method for providing function-enabling data that is specifically tailored for an individual communications device and for preventing unauthorized use of said program control information by alteration, duplication or downloading into other products, comprising the following steps of:

(a) providing said digital radio communications device with a serially assigned numerical value unique to said digital radio communications device, said assigned value stored within said digital communications device;

(b) performing a data transformation operation on selected function-enabling data using said assigned value, said transformation operation performed prior to storing said function-enabling data in said associated memory;

(c) storing the transformed function-enabling data in said associated memory along with program information for performing a reverse data transformation operation for reproducing said selected function-enabling data from transformed function-enabling data.

15. A method of operating a radio frequency communications device comprising:

(a) reading a feature authorization code;

(b) reading an identification code that identifies said device;

(c) computing a value in response to said feature authorization code and said identification code;

(d) testing said computed value; and (e) selectively enabling at least one radio communicating feature based on results of said test and said feature authorization code.

16. A method as in claim 15 wherein:

said feature authorization code specifies plural radio transceiving features; and said selectively enabling step (e) enables the plural radio transceiving features specified by said feature authorization code.

17. A method as in claim 15 wherein said enabling step (e) disables said feature if said test is unfavorable, and selectively enables said feature based on the content of said feature authorization code if said test is favorable.

18. A method as in claim 15 further including decrypting said read feature authorization code.

19. A method as in claim 15 wherein said testing step comprises comparing said computed value with a predefined stored value.

20. A method of operating radio frequency equipment comprising:

(a) reading feature authorization information from a medium;

(b) determining whether said read feature authorization information authorizes performance of an optional radio feature;

(c) testing authenticity of said read feature authorization information to determine whether it originated from an authorized source; and (d) enabling said equipment to operate in accordance with said optional radio feature only if said determining step (b) determines that said optional radio feature is authorized and said testing step (c) reveals that said feature authorization information is from said authorized source.

21. The method as set forth in claim 20 wherein said testing step (c) comprises performing a least one computation involving said read feature authorization information that ensures that said read feature authorization information corresponds to feature authorization information specifically authorized for said equipment.

22. The method as set forth in claim 20 wherein said feature authorization information read in step (a) is in an encrypted form and said determining step (b) includes decrypting said read feature authorization information.

23. The method as set forth in claim 20 wherein said testing step (c) comprises:

computing a first numerical value from a mathematical transformation of said read feature authorization information that employs a preassigned serial-number for said equipment, and comparing the results of said first numerical value to a predetermined second numerical value previously stored in said equipment.

24. The method as set forth in claim 23 wherein said second numerical value is the result of an earlier calculation of said mathematical transformation of said computation step.

25. A method of operating radio frequency transceiving equipment comprising:

(a) reading feature authorization information from a medium;

(b) testing of said feature authorization information read by said reading step (a) to determine whether said authorization information is from an authorized source;

(c) if said testing step (b) reveals said read feature authorization information is from said authorized source, enabling at least one optional radio feature specified by said read feature authorization information; and (d) transmitting and receiving radio frequency electromagnetic signals in accordance with said enabled optional radio feature.

26. A method as in claim 25 wherein:

said feature authorization information specifies whether said equipment is authorized to perform a first tier of optional functions and also specifies whether said equipment is authorized to perform a second tier of optional functions; and said enabling step (c) selectively enables said first and second tiers based on said feature authorization information.

27. The method as set forth in claim 25 wherein said testing step (b) comprises performing a least one computation involving said read feature authorization information that ensures that said read feature authorization information corresponds to feature authorization information specifically authorized for said equipment.

28. The method as set forth in claim 25 wherein said feature authorization information read in step (a) is in an encrypted form and said reading step (a) further includes decrypting said read feature authorization information.

29. The method as set forth in claim 25 wherein said testing step (b) comprises:

computing a first digital value from a predetermined mathematical transformation of said read feature authorization information that employs a binary number uniquely preassigned to said equipment, and comparing the results of said transformation to a predetermined second digital value previously stored in a non-programmable read-only memory in said equipment.

30. The method as set forth in claim 29 wherein said second digital value is the result of an earlier calculation of said mathematical transformation of said computation step.

31. Radio frequency equipment comprising:

a housing;

a storage medium disposed within said housing, said storage medium storing coded feature authorization information;

enabling means, disposed within said housing and coupled to said storage medium, for enabling performance of an optional radio feature if read feature authorization information indicates said optional radio feature is to be enabled and said read feature authorization information is from an authorized source; and radio frequency circuitry connected to said enabling means and at least partially disposed within said housing, said radio frequency circuitry functioning in accordance with said optional radio feature if said enabling means enables performance of said optional radio feature.

32. Radio frequency equipment as in claim 31 wherein said enabling means includes cryptographic means for determining whether said feature authorization information is from said authorized source.

33. Radio frequency transceiving equipment comprising:
radio frequency transceiving circuitry that transmits and receives radio frequency electromagnetic signals;
a medium that stores feature authorization information indicating whether an optional radio transceiving function is authorized;
an authenticating arrangement connected to said medium, said authenticating arrangement testing whether said feature authorization information is from an authorized source; and
a controller for said radio frequency transceiving equipment, said controller cooperating with said radio frequency transceiving circuitry, said medium and said authenticating arrangement to perform said optional radio transceiving function if said optional radio transceiving function is authorized by said feature authorization information and authenticating arrangement testing indicates said feature authorization information is from an authorized source.

34. A digital radio comprising:
a digitally controlled radio transmitter;
a digitally controlled radio receiver;
a digital controller connected to said radio transmitter and said radio receiver, said digital controller operating in accordance with stored program control information; and
an arrangement for preventing unauthorized alteration, copying or downloading of said program control information into other products, comprising:
a memory storing feature authorization information and a digital code identifying said radio; wherein said digital controller authenticates, using at least one predetermined data transformation operation, said stored feature authorization information and said digital code as being from an authorized source and wherein said digital controller allows selected transceiving functions to operate if said function enabling information and said digital code are authentic.

35. A digital radio comprising:
a digitally controlled radio transmitter;
a digitally controlled radio receiver;
a memory storing feature authorization information and a digital ID code identifying said digital radio;
a digital controller connected to said radio transmitter and said radio receiver; wherein said digital controller includes means for transforming said ID code and said feature authorization information to provide transformed results, and means for testing said transformed results to determine whether said feature authorization code is authorized for said ID code.

36. A method for preventing unauthorized alteration, copying or downloading of control information stored in a digitally controlled communications device into other products, comprising:

(a) storing feature authorization information and a digital ID code identifying said digital communications device in a memory in said device; said communications device digitally controlled to perform only communications functions authorized in said feature authorization information;

(b) transforming said ID code and said feature authorization information to provide transformed results, and (c) storing said transformed results in a memory in said communications device; said communications device transforming said ID code and said feature authorization information to provide transformed results, and testing said transformed results to determine whether said feature authorization code is authorized for said ID code.

37. A method of operating radio equipment having at least one memory device storing code and also storing feature authorization information, said stored code at least in part defining a first processing operation and associated characteristics of the operation of said radio equipment, said method comprising the following steps:

(a) reading at least a part of said feature authorization information from said memory device;

(b) determining if said feature authorization information authorizes said first processing operation;

(c) determining if said feature authorization information is authentic;

(d) tuning to selected radio frequencies based at least in part on said stored code; and (e) processing radio frequency signals transmitted over the air at said selected radio frequencies, including performing said first processing operation if said determining step (b) determines said first processing operation is authorized and said determining step (c) determines said feature authorization information is authentic.

38. A method as in claim 37 wherein said step (e) includes transmitting and receiving radio frequency signals.

39. A method as in claim 37 wherein said determining step (c) includes performing at least one cryptographic operation based at least in part on said feature authorization information using a cryptographic key based at least in part on a value distinguishing said radio equipment from other radio equipment.

40. A method as in claim 39 wherein said radio equipment includes a read only arrangement providing said value, and said method further includes reading said value from said read only arrangement.

41. A method as in claim 37 wherein said determining step (c) includes authenticating that said feature authorization information was created by a known source.

42. A method as in claim 37 wherein said determining step (c) includes authenticating that said feature authorization information is customized to correspond on a one-to-one basis with said radio equipment.

* * * * *